United States Patent
Cretier et al.

(10) Patent No.: US 9,494,713 B2
(45) Date of Patent: Nov. 15, 2016

(54) OPTICAL ARTICLE COMPRISING A TEMPORARY ANTIFOG COATING BASED ON SORBITAN SURFACTANTS

(75) Inventors: Annette Cretier, Charenton le Pont (FR); Charlotte Saint-Lu, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 334 days.

(21) Appl. No.: 14/351,327

(22) PCT Filed: Oct. 14, 2011

(86) PCT No.: PCT/EP2011/068032
§ 371 (c)(1),
(2), (4) Date: Apr. 11, 2014

(87) PCT Pub. No.: WO2013/053406
PCT Pub. Date: Apr. 18, 2013

(65) Prior Publication Data
US 2014/0234637 A1    Aug. 21, 2014

(51) Int. Cl.
*G02B 1/04* (2006.01)
*G02B 1/111* (2015.01)

(52) U.S. Cl.
CPC .............. *G02B 1/04* (2013.01); *G02B 1/111* (2013.01); *Y10T 428/31663* (2015.04)

(58) Field of Classification Search
CPC ........ G02B 1/111; G02B 1/04; C09D 171/00
See application file for complete search history.

(56) References Cited

U.S. PATENT DOCUMENTS

| | | |
|---|---|---|
| 4,211,823 A | 7/1980 | Suzuki et al. |
| 5,015,523 A | 5/1991 | Kawashima et al. |
| 5,997,621 A | 12/1999 | Scholz et al. |
| 6,251,523 B1 | 6/2001 | Takahashi et al. |
| 6,287,683 B1 | 9/2001 | Itoh et al. |
| 6,379,776 B1 | 4/2002 | Tada et al. |
| 6,958,172 B2 | 10/2005 | Shirakawa et al. |
| 7,153,584 B2 | 12/2006 | Shirakawa et al. |
| 2003/0017303 A1 | 1/2003 | Shindo et al. |
| 2003/0129422 A1 | 7/2003 | Shirakawa et al. |
| 2003/0165698 A1 | 9/2003 | Vaneeckhoutte et al. |
| 2005/0123771 A1 | 6/2005 | Vaneeckhoutte et al. |
| 2005/0221079 A1 | 10/2005 | Shirakawa et al. |
| 2012/0019767 A1* | 1/2012 | Cadet .................. C03C 17/30 351/62 |

FOREIGN PATENT DOCUMENTS

| | | |
|---|---|---|
| EP | 0614957 | 9/1994 |
| EP | 0871046 | 10/1998 |
| EP | 1275624 | 1/2003 |
| EP | 1324078 | 7/2003 |
| JP | 2004-317539 | 11/2004 |
| JP | 2005-281143 | 10/2005 |
| WO | 2011/080472 | 7/2011 |

OTHER PUBLICATIONS

International Search Report dated Dec. 13, 2011, corresponding to PCT/EP2011/068032.
Schmidt, et al.; "Multifunctional Inorganic-Organic Composite Sol-Gel Coatings for Glass Surfaces"; vol. 178, Nov. 3, 1994; pp. 302-312.

* cited by examiner

*Primary Examiner* — Kuo-Liang Peng
(74) *Attorney, Agent, or Firm* — Young & Thompson

(57) ABSTRACT

An optical article includes a substrate having a main surface coated with an antireflection coating and, directly contacting the antireflection coating, a precursor coating of an antifog coating obtained through the grafting on the antireflection coating of at least one compound B bearing a polyoxyalkylene group, the coating precursor of the antifog coating being coated with a surfactant film so as to form an antifog coating. The surfactant film contains at least one surfactant A having a sorbitan ring hydroxyl groups functionalized with OH-terminated polyoxyalkylene groups and R1 groups of formula:—$(R_dO)_z$—$(Y)_{n2}$—R', in which $R_d$ is an alkylene group, z is an integer >1, Y is a divalent group, n2 is 0 or 1 and R' is a saturated hydrocarbon group having 12 to 19, preferably 13 to 19 carbon atoms. Surfactants A provide a visual indication whether or not the antifogging effect will still be long-lasting.

20 Claims, No Drawings

OPTICAL ARTICLE COMPRISING A TEMPORARY ANTIFOG COATING BASED ON SORBITAN SURFACTANTS

The present invention relates to an optical article provided with a temporary antifog coating, preferably a spectacle lens, comprising a precursor coating of an antifog coating, wherein the antifog coating precursor coating is further coated with a surfactant film comprising specific surfactant molecules of sorbitan nature, that make it possible to know whether or not the antifogging effect will still be long-lasting.

Very numerous supports, such as plastic materials and glass, suffer as a drawback from becoming covered with fog when their surface temperature decreases below the dew point of ambient air. This is especially the case with the mineral or organic glass that is used to make glazing for transportation vehicles or buildings, lenses, especially for spectacles, mirrors, and so on. The fogging that develops on these surfaces leads to a decrease in transparency, due to the diffusion of light through water drops, which may cause an alteration of vision.

To prevent any fog formation in very damp environments, that is to say the condensation of very little water droplets on a support, it has been suggested to apply hydrophilic coatings onto the outer surface of such support, with a low static contact angle with water, preferably of less than 10°, more preferably of less than 5°. Such permanent antifog coatings do act as sponges toward fog and enable the water droplets to adhere to the surface of the support by forming a very thin film that gives an impression of transparency. These coatings are generally made of highly hydrophilic species such as sulfonates or polyurethanes.

Commercially available products comprise several micrometer-thick hydrophilic layers.

As a rule, when the thickness of the coatings is high (several microns), these coatings, as a consequence of water absorption, do swell, soften and become mechanically less resistant.

As used herein, a permanent antifog coating is intended to mean a coating which hydrophilic properties result from hydrophilic compounds permanently bound to another coating or support and which has antifog properties.

The application EP 1324078 describes a lens coated with an abrasion-resistant coating and a multilayered antireflective coating comprising layers with high and low refractive indexes alternating with each other, amongst which the outer layer is a low refractive index layer (1.42-1.48) of from 5 to 100 nm thickness forming an antifog coating consisting in a hybrid layer with a static contact angle with water of less than 10°, obtained through vacuum coevaporation of an organic compound and silica or of silica and alumina.

Said organic compound comprises one hydrophilic group and one reactive group, for example a trialkoxysilyl group, and has preferably a molecular weight ranging from 150 to 1500 g/mol. Some preferred compounds possess a polyether backbone, especially one polyoxyethylene and one reactive group on each end of the molecule. Preferred compounds include polyethylene glycol glycidyl ether, polyethylene glycol monoacrylate and N-(3-trimethoxysilylpropyl)gluconamide.

The antifog coating therefore comes as a silica-based layer (or a silica+alumina-based layer) incorporating a hydrophilic organic compound. However, its antifog character does change over time, and it can be observed a stepwise deterioration of the antifogging properties.

The American U.S. Pat. Nos. 6,251,523 and 6,379,776 describe an antireflective, antifog glass for cars or lenses, comprising a glass substrate provided with an antireflective coating based on 110-250 nm-thick silica with a surface roughness Ra of about 5-10 nm, in turn provided with a 8 nm-thick permanent antifog coating obtained through liquid or vapor deposition of the compound $CH_3O$—$(CH_2CH_2O)_{6-9}$—$(CH_2)_3Si(OCH_3)_3$ or a hydrolyzate thereof. At the initial stage, the antifog coating has a static contact angle with water of 3°.

Another solution to combine antireflective and antifogging properties consists in using a thin porous low refractive index layer, partially made of surfactants, which enable the layer to acquire antifogging properties. This layer is generally deposited onto a hydrophilic surface.

Thus, the U.S. Pat. No. 5,997,621 describes a porous antireflective and antifog coating based on metal oxides (silica beads) and relatively water-soluble anionic surfactants, having generally an ionic hydrophilic head of the carboxylic acid, sulfonate or phosphate type and a fluorinated chain. In order to be immobilized on a substrate, the surfactants are preferably able to covalently bind to the metal oxides. The application WO 97/43668 describes a similar construction.

The application EP 0871046 describes an antireflective and antifog system comprising one inorganic oxide-based porous layer deposited onto a few micrometer-thick water absorbing layer, obtained through polycondensation of an inorganic alkoxide hydrolyzate in the presence of a polyacrylic acid compound. The porous layer, which acts as the antireflective barrier, allows water to access the absorbing layer.

Antifogging properties may also be obtained by applying temporary solutions commercially available as sprays or towelettes, onto spectacle lenses comprising as the outer layer an antisoiling coating (hydrophobic and oleophobic), often considered as essential when ophthalmic lenses are provided with an antireflective coating. They make it possible to obtain the antifogging property on a short period of time. The ease of soil removal aspect that is given to the antisoiling coating is preserved, but after a couple of wiping operations, the antifogging property is significantly altered. Indeed, temporary solutions comprise materials that are hydrophilic in nature with poor interactions with the antisoiling coating hydrophobic surface, so that after a few wiping operations, these hydrophilic materials are removed.

A more interesting solution consists in making an antifog coating by applying a temporary hydrophilic solution onto the surface of an antifog coating precursor coating, which represents an alternative to permanent antifog coatings.

The application EP 1275624 describes a lens coated with a hard, inorganic, hydrophilic layer based on metal oxides and silicon oxide. Its hydrophilic nature and the presence of nanosized concave portions on the surface thereof enable to impregnate a surfactant and to retain the same adsorbed over a long period of time, thus maintaining an antifog effect for several days. However, an antifog effect can also be observed in the absence of any surfactant.

The applications JP 2004-317539 and JP 2005-281143 describe a lens coated with a multilayer antireflective coating and/or with an abrasion-resistant coating and with an antifog coating precursor coating, having a static contact angle with water of from 50° to 90°. The antifog coating as such, which is a temporary coating, is obtained after application of a surfactant onto the surface of the precursor coating.

The antifog coating precursor coating is obtained from a composition comprising organic compounds comprising a reactive group capable of reacting with the outer silica layer of the antireflective coating, such as $CH_3O(CH_2CH_2O)_{22}CONH(CH_2)_3Si(OCH_3)_3$ and $C_8F_{17}O(CH_2CH_2O)_2CONH(CH_2)_3Si(OCH_3)_3$. The precursor coating is described as being 0.5 to 20 nm thick.

The patent application WO 2011/080472 describes a spectacle lens comprising a substrate provided with a coating comprising silanol groups on the surface thereof and, directly contacting this coating, an antifog coating precursor coating, wherein the antifog coating precursor coating:

is obtained through the grafting of at least one organosilane compound possessing:
   a polyoxyalkylene group comprising less than 80 carbon atoms, and
   at least one silicon atom carrying at least one hydrolyzable group,
has a thickness lower than or equal to 5 nm,
has a static contact angle with water of more than 10° and of less than 50°.

The surfactant solution which is preferably deposited to provide this surface with temporary antifogging properties is the commercially available solution Optifog™ activator. Preferred surfactants have a structure comprising poly(oxyalkylene) groups.

The antifogging properties, especially the durability of the antifogging effect associated with the lens precursor coating described in the patent application WO 2011/080472, are very satisfactory. Typically, the antifogging effect is observed on the lens surface for about 7 days after applying the surfactant composition.

Practically, the wearer is informed that he or she must "reload" its ophthalmic lenses with an additional amount of surfactant when the lenses no longer display an antifogging effect, i.e., when fog is again formed on the lenses under fog generating conditions. Convenience for the use of such antifog coatings still needs to be improved.

Indeed, it would be helpful to provide the wearer with a way of knowing if he or she has soon to re-apply a new surfactant film on his or her ophthalmic lens before losing the antifog properties. According to the invention, this has been achieved by a visual indicator which is created by the use of a specific surfactant in combination with a specific antifog coating precursor coating.

Antifog coatings for optical articles such as spectacles further having good mechanical properties (abrasion and scratch resistance) are still sought after.

The present invention aims at preparing such temporary antifog coatings, which exhibit satisfactory durability of the antifogging property over time and/or under mechanical stresses, while preserving an acceptable ease of soil removal. The glide ability of a cloth on the surface of the lens provided with such an antifog coating (e.g. during wiping) is also a very important parameter to be taken into account.

It is another objective of the present invention to provide an antifog coating that would not affect the transparency of the optical article and that would be immediately operational, that is to say a coating which, when a transparent lens substrate coated with such coating is placed under conditions generating fog onto said substrate being devoid of said coating, enables to immediately attain (that is to say in less than one second) a vision >6/10 (visual acuity), and preferably of 10/10, without fog formation for an observer looking through a coated lens according to the Snellen E visual acuity scale (ARMAIGNAC scale (Tridents) (Snellen E) reading at 5 meters, ref. T6 available from FAX INTERNATIONAL), located at a distance of 5 meters.

It is a further objective of the present invention to provide an optical article having both antireflective and antifogging properties.

The present inventors discovered that these objectives may be aimed at by a particular surfactant family, which modifies the residual color of antireflection coatings applied on transparent substrates, provided that said antireflection coating is further coated with a precursor coating of an antifog coating comprising polyoxyalkylene group-containing compounds, and that it was possible to take advantage of this property for providing a surfactant level visual control for antireflection lenses coated with a temporary antifog coating. In other words, the antireflection coating uniformly displays the modified residual color so long as a sufficient amount of the inventive surfactant is still present at the surface of the antifog coating precursor comprising polyoxyalkylene group-containing compounds.

It is well-known that almost all antireflection coating exhibits some residual color seen in the reflections, even the most efficient multilayer antireflection coatings. Residual color of an antireflection coating is a well-controlled parameter, which is reproducible. The variations in color and intensity sometimes even help to identify the manufacturer of the coated product.

The surfactants that present the above described beneficial effect belong to a known surfactant family, i.e., the polyalkoxylated sorbitanes.

A member of this class (Tween™ 40) has been shown in U.S. Pat. No. 2,561,010 to provide antifogging properties to the internal surface of transparent packages of film materials containing a food stuff. Such transparent wrapping materials comprises an embedded surfactant or have been treated with liquid solutions containing surfactants, including Tween™ 40, so as to be able to spread water condensates over the entire surface, thus causing rays of light passing through the wet film to be all refracted at the same angle, which prevents the lens from being befogged.

However, combination of an antireflection coating with a film of a polyoxyalkylenated sorbitane such as Tween™ 40 has not been contemplated.

Thus, the present invention relates to an optical article, preferably a spectacle lens, comprising a substrate having at least one main surface coated with an antireflection coating and, directly contacting said antireflection coating, a precursor coating of an antifog coating obtained through the grafting on said antireflection coating of at least one compound B bearing a polyoxyalkylene group, said coating precursor of the antifog coating being coated with a surfactant film so as to form an antifog coating. Said surfactant film contains at least one surfactant A having a sorbitan ring with n of its four hydroxyl groups functionalized with the same or different OH-terminated polyoxyalkylene groups, and p of its four hydroxyl groups functionalized with the same or different $R^1$ groups of formula:

in which $R_d$ is an alkylene group, z is an integer ≥1, Y is a divalent group, n2 is 0 or 1 and R' is a saturated hydrocarbon group having from 12 to 19, preferably 13 to 19 carbon atoms, n and p being integers such that n=2 or 3 and p=1 or 2 with n+p=4.

In the present application, a coating that is "on" a substrate/coating or which has been deposited "onto" a substrate/coating is defined as a coating that (i) is positioned above the substrate/coating, (ii) is not necessarily in contact with the substrate/coating, that is to say one or more intermediate coatings may be arranged between the substrate/coating and the coating in question (however, it is preferably in contact with said substrate/coating), and (iii) does not necessarily completely cover the substrate/coating. When "a layer 1 is arranged under a layer 2", it is intended to mean that layer 2 is more distant from the substrate than layer 1.

As used herein, an "antifog coating" is intended to mean a coating which, when a transparent lens substrate coated with such coating is placed under conditions generating fog onto said substrate being devoid of said coating, enables to immediately attain a visual acuity >6/10 for an observer looking through a coated lens at a visual acuity scale located at a distance of 5 meters. Several tests to evaluate the antifogging properties of a coating are described in the experimental section. Under fog generating conditions, antifog coatings may either not present fog on their surface (ideally no visual distortion, or visual distortion but visual acuity >6/10 under the hereabove mentioned measurement conditions), or may present some fog on their surface but yet enable, despite the vision perturbation resulting from fog, a visual acuity >6/10 under the hereabove mentioned measurement conditions. A non-antifog coating does not allow a visual acuity >6/10 as long as it is exposed to conditions generating fog and generally presents a condensation haze under the hereabove mentioned measurement conditions.

As used herein, an "antifog optical article" is intended to mean an optical article provided with an "antifog coating" such as defined hereabove.

Thus, the antifog coating precursor according to the invention, which is a hydrophilic coating, is not considered as being an antifog coating according to the present invention, even if it has some antifogging properties. Indeed, this antifog coating precursor does not allow to obtain a visual acuity >6/10 under the hereabove mentioned measurement conditions.

As used herein, a temporary antifog coating is intended to mean an antifog coating obtained after having applied onto the surface of the precursor coating of said antifog coating a surfactant film containing at least one surfactant.

The durability of a temporary antifog coating is generally limited by the wiping operations performed on its surface, the surfactant molecules being not permanently attached to the surface of the coating but just adsorbed for a more or less durable period of time.

The optical article prepared according to the invention comprises a substrate, preferably transparent, having front and rear main surfaces, at least one of said main surfaces being provided with an antireflection coating preferably comprising silanol groups on the surface thereof, preferably on both main surfaces. As used herein, the rear face (generally concave) of the substrate is intended to mean the face which, when using the article, is the nearest from the wearer's eye. On the contrary, the front face (generally convex) of the substrate, is the face which, when using the article, is the most distant from the wearer's eye.

Although the article according to the invention may be any optical article that may encounter a problem of fog formation, such as a screen, a glazing for the automotive industry or the building industry, or a mirror, it is preferably an optical lens, more preferably an ophthalmic lens, for spectacles, or a blank for optical or ophthalmic lenses.

This excludes articles such as intraocular lenses which are in contact with living tissues or contact lenses, which do not intrinsically face the problem of fog formation, as opposed to lenses for spectacles.

The optical article of the invention is preferably transparent. As used herein, a "transparent" optical article is an optical article having a relative light transmission factor in the visible spectrum, $T_v$, higher than 90%, preferably higher than 91%, more preferably higher than 92%, even more preferably higher than 97.5%, even better higher than 98%. The $T_v$ factor is such as defined in the standard NF EN 1836 and corresponds to the 380-780 nm wavelength range.

According to the invention, the outer surface of the antireflection coating preferably comprises silanol groups. Said antireflection coating may be formed on at least one of the main surfaces of a bare substrate, that is to say a non coated substrate, or on at least one of the main surfaces of a substrate that has already been coated with one or more functional coatings.

The substrate for the optical article according to the invention may be a mineral or organic glass, for example of a thermoplastic or thermosetting plastic material.

Especially preferred classes of substrates include poly(thiourethanes), polyepisulfides and resins resulting from the polymerization or (co)polymerization of alkyleneglycol bis allyl carbonates. These are sold, for example, under the trade name CR-39® by the PPG Industries company (ORMA® lenses, from ESSILOR).

In some applications, it is preferred that the substrate's main surface be coated with one or more functional coatings prior to depositing the antireflection coating. These functional coatings traditionally used in optics may be, without limitation, an impact-resistant primer layer, an abrasion-resistant and/or a scratch-resistant coating, a polarized coating, a photochromic coating or a tinted coating, particularly an impact-resistant primer layer coated with an abrasion-resistant and/or a scratch-resistant layer.

The antireflection coating is preferably deposited onto an abrasion-resistant and/or a scratch-resistant coating. The abrasion-resistant coating and/or the scratch-resistant coating may be any layer traditionally used as an abrasion-resistant coating and/or scratch-resistant coating in the ophthalmic lenses field.

The abrasion-resistant and/or scratch-resistant coatings are preferably hard coatings based on poly(meth)acrylates or silanes comprising generally one or more mineral fillers that are intended to improve the hardness and/or the refractive index of the coating once cured. As used herein, a (meth)acrylate is an acrylate or a methacrylate.

The abrasion-resistant coating and/or scratch-resistant hard coatings are preferably made from compositions comprising at least one alkoxysilane and/or a hydrolyzate thereof, obtained for example through hydrolysis with a hydrochloric acid solution, and optionally condensation and/or curing catalysts and/or surfactants.

Recommended coatings of the present invention include coatings based on epoxysilane hydrolyzates such as those described in the patents EP 0614957, U.S. Pat. Nos. 4,211,823 and 5,015,523.

The thickness of the abrasion-resistant coating and/or scratch-resistant coating does generally vary from 2 to 10 µm, preferably from 3 to 5 µm.

Prior to depositing the abrasion-resistant coating and/or the scratch-resistant coating, it is possible to apply onto the substrate a primer coating to improve the impact resistance and/or the adhesion of the subsequent layers in the final product.

This coating may be any impact-resistant primer layer traditionally used for articles in a transparent polymer material, such as ophthalmic lenses.

Preferred primer compositions may be chosen from those described in WO 2011/080472, which is hereby incorporated by reference.

Preferred primer compositions are compositions based on polyurethanes and compositions based on latexes, particularly polyurethane type latexes and poly(meth)acrylic latexes, and their combinations. Primer layers generally have thicknesses, after curing, ranging from 0.2 to 2.5 µm, preferably ranging from 0.5 to 1.5 µm.

The antireflection coating may be any antireflection coating traditionally used in the optics field, particularly ophthalmic optics. An antireflective coating is defined as a coating, deposited onto the surface of an optical article, which improves the antireflective properties of the final optical article. It makes it possible to reduce the light reflection at the article-air interface over a relatively large portion of the visible spectrum.

As is also well known, antireflection coatings traditionally comprise a monolayered or a multilayered stack composed of dielectric materials. These are preferably multilayered coatings, comprising layers with a high refractive index (HI) and layers with a low refractive index (LI).

In the present application, a layer of the antireflective coating is said to be a layer with a high refractive index when its refractive index is higher than 1.55, preferably higher than or equal to 1.6, more preferably higher than or equal to 1.8 and even more preferably higher than or equal to 2.0. A layer of an antireflective coating is said to be a low refractive index layer when its refractive index is lower than or equal to 1.55, preferably lower than or equal to 1.50, more preferably lower than or equal to 1.45. Unless otherwise specified, the refractive indexes referred to in the present invention are expressed at 25° C. at a wavelength of 550 nm.

The HI and LI layers are traditional layers well known in the art, generally comprising one or more metal oxides, which may be chosen, without limitation, from the materials disclosed in WO 2011/080472.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to $SiO_2+Al_2O_3$ total weight in this layer.

Typically, HI layers have a physical thickness ranging from 10 to 120 nm, and LI layers have a physical thickness ranging from 10 to 100 nm.

Preferably, the antireflective total thickness is lower than 1 micron, more preferably lower than or equal to 800 nm and even more preferably lower than or equal to 500 nm. The antireflective total thickness is generally higher than 100 nm, preferably higher than 150 nm.

Still more preferably, the antireflective coating comprises at least two layers with a low refractive index (LI) and at least two layers with a high refractive index (HI). Preferably, the total number of layers in the antireflective coating is lower than or equal to 8, more preferably lower than or equal to 6.

HI and LI layers do not need to alternate with each other in the antireflective coating, although they also may, according to one embodiment of the invention. Two HI layers (or more) may be deposited onto each other, as well as two LI layers (or more) may be deposited onto each other.

The various layers of the antireflective coating may be deposited according to any one of the methods disclosed in WO 2011/080472, which is hereby incorporated by reference. A particularly recommended method is evaporation under vacuum.

The luminous reflection factor of the optical article according to the invention, noted $R_v$, is preferably of less than 2.5% per face of the article. The means to reach such $R_v$ values are well known from the person skilled in the art. In the present application, the "luminous reflection factor" is such as defined in the ISO standard 13666:1998, and is measured according to ISO 8980-4 standard, that is to say it is the weighted average of the spectral reflectivity within all the visible spectrum wavelength range from 380 to 780 nm.

The antireflection coating is a monolayered or multilayered antireflective coating, the outer layer of which preferably has silanol groups on its surface. As used herein, the outer layer of a coating is intended to mean the layer of said coating that is the most distant from the substrate.

As used herein, a coating comprising silanol groups on the surface thereof is intended to mean a coating which naturally comprises silanol groups on the surface thereof or a coating which silanol groups have been created after having been submitted to a surface activation treatment, such as described e.g. in WO 2011/080472.

This coating is therefore a coating based on siloxanes or silica, for example, without limitation, a silica-based layer, a sol-gel coating, based on organosilane species such as alkoxysilanes, or a coating based on silica colloids. Said outer layer comprising silanol groups on the surface thereof is preferably a low refractive index layer based on silica (comprising silica), most preferably it consists in a silica-based layer ($SiO_2$), generally obtained through vapor phase deposition.

Said layer based on $SiO_2$ may comprise, in addition to silica, one or more other materials traditionally used for making thin layers, for example one or more materials selected from dielectric materials described in the present specification. This layer based on $SiO_2$ is preferably free of $Al_2O_3$.

The coating comprising silanol groups on the surface thereof preferably comprises at least 70% by weight of $SiO_2$, more preferably at least 80% by weight and even more preferably at least 90% by weight of $SiO_2$. As has already been noticed, in a most preferred embodiment, it comprises 100% by weight of silica.

The outer layer or the antireflection coating comprising silanol groups on the surface thereof may also be a sol-gel coating based on silanes such as alkoxysilanes, for example tetraethoxysilane or organosilanes such as γ-glycidoxypropyl trimethoxysilane. Such a coating is obtained through wet deposition, by using a liquid composition comprising a hydrolyzate of silanes and optionally colloidal materials with a high (>1.55, preferably >1.60, more preferably >to 1.70) or a low (≤1.55) refractive index. Such a coating which layers comprise an organic/inorganic hybrid matrix based on silanes wherein colloidal materials are dispersed to adjust the refractive index of each layer are described for example in the patent FR 2858420.

Preferred antireflection coating are those which display a residual color.

Prior to forming the antifog coating precursor on the antireflection coating, it is usual to submit the surface of such coating to a physical or chemical activation treatment intended to reinforce the adhesion of the antifog coating precursor. These treatments may be selected from those described for the same purpose in WO 2011/080472.

According to the invention, the antireflection coating is directly in contact with the precursor coating of an antifog coating, which will be described hereunder.

As used herein, "a precursor of an antifog coating" is intended to mean a coating which, if a surfactant film is applied on the surface thereof, forms an antifog coating within the meaning of the invention. The system precursor coating+surfactant-based film represents the antifog coating as such.

The antifog coating precursor coating is a coating having a thickness preferably lower than or equal to 5 nm, preferably of 4 nm or less, more preferably of 3 nm or less and even more preferably of 2 nm or less, possessing preferably a static contact angle with water of more than 10° and of less than 50°, which is obtained through a permanent grafting of at least one compound bearing a polyoxyalkylene group.

Said compound bearing a polyoxyalkylene group generally has at least one group capable of establishing a covalent bond with a functional group present on the outer surface of the antireflection coating onto which it must be grafted, preferably a silanol group. This reactive group can be, without limitation, one of the following groups: an isocyanate, acrylate, methacrylate, halogenoalkyl, carboxylic or sulfonic acid, acyl chloride, chlorosulfonyl, chloroformiate, ester, a silicon atom bearing at least one hydrolyzable group, or a group containing an epoxy function such as the glycidyl group.

The compound bearing a polyoxyalkylene group is preferably an organosilane compound possessing a polyoxyalkylene group and at least one silicon atom bearing at least one hydrolyzable group.

In one embodiment of the invention, the antifog coating precursor coating is deposited by applying a composition comprising a hydrolyzate of the organosilane compound possessing a polyoxyalkylene group and at least one silicon atom carrying at least one hydrolyzable group.

It is recommended to avoid any condensation of the hydrolyzed organosilane compounds so that they can keep as much as possible the silanol functions free to react so as to facilitate the grafting of these compounds onto the surface of the optical article and to limit the formation of siloxane prepolymers before grafting. That is the reason why the deposited organosilane compound thickness is so thin.

It is therefore recommended to apply the composition relatively quickly after the hydrolysis, typically within less than 2 hours, preferably less than 1 hour, more preferably less than 30 minutes after having performed the hydrolysis (by adding a typically HCl-based, acidic aqueous solution).

Most preferably, the composition is applied less than 10 minutes, even more preferably less than 5 minutes and preferably less than 1 minute after having performed the hydrolysis.

It is preferred to conduct the hydrolysis without supplying heat, i.e. typically at a temperature of from 20 to 25° C.

Generally, the deposition of few nanometer-thick layers requires to use very diluted compositions, with a very low dry matter content, which slows down the condensation kinetics.

The compound bearing a polyoxyalkylene group used, preferably an organosilane compound, is capable, thanks to its reactive group, preferably a silicon-containing reactive group, to establish a covalent bond with groups such as silanol groups that may be present on the surface of the coating onto which it is deposited.

In the preferred embodiment, the organosilane compound of the invention comprises a polyoxyalkylene chain functionalized at only one end or at both ends thereof, preferably at only one end, by a group comprising at least one silicon atom carrying at least one hydrolyzable group. This organosilane compound comprises preferably a silicon atom carrying at least two hydrolyzable groups, preferably three hydrolyzable groups. Preferably, it does not comprise any urethane group. It is preferably a compound of formula:

$$R^{11}Y'_m Si(X)_{3-m} \quad (I)$$

wherein the Y' groups, being the same or different, are monovalent organic groups bound to the silicon atom through a carbon atom, the groups X, being the same or different, are hydrolyzable groups, $R^{11}$ is a group comprising a polyoxyalkylene function, m is an integer equal to 0, 1 or 2. Preferably m=0.

The X groups are preferably selected from alkoxy groups —O—$R^3$, particularly $C_1$-$C_4$ alkoxy groups, acyloxy groups —O—C(O)$R^4$ where $R^4$ is an alkyl radical, preferably a $C_1$-$C_6$ alkyl radical, preferably a methyl or an ethyl, halogens such as Cl, Br and I or trimethylsilyloxy $(CH_3)_3SiO$—, and combinations of these groups. Preferably, the X groups are alkoxy groups, and particularly methoxy or ethoxy groups, and more preferably ethoxy groups.

The Y' group, present when m is not zero, is preferably a saturated or unsaturated hydrocarbon group, preferably a $C_1$-$C_{10}$ and more preferably a $C_1$-$C_4$ group, for example an alkyl group, such as a methyl or an ethyl group, a vinyl group, an aryl group, for example an optionally substituted phenyl group, especially substituted by one or more $C_1$-$C_4$ alkyl groups. Preferably Y' represents a methyl group.

In a preferred embodiment, the compound of formula I comprises a trialkoxysilyl group such as a triethoxysilyl or a trimethoxysilyl group.

The polyoxyalkylene group of the organosilane compound (group $R^{11}$) comprises preferably less than 80 carbon atoms, more preferably less than 60 carbon atoms, and even more preferably less than 50 carbon atoms. Most preferably, the polyoxyalkylene group comprises less than 40 carbon atoms and more preferably less than 30 carbon atoms. The most preferred compounds have a polyoxyalkylene group which comprise from 5 to 20 carbon atoms. The $R^{11}$ group preferably satisfies the same conditions.

The $R^{11}$ group corresponds generally to the formula -L-$R^2$ where L is a divalent group bound to the silicon atom of the compounds of formula I through a carbon atom, and $R^2$ is a group comprising a polyoxyalkylene group bound to the group L through an oxygen atom, this oxygen atom being included in the group $R^2$. Non limiting examples of L groups include linear or branched, optionally substituted alkylene, cycloalkylene, arylene, carbonyl, amido groups, or combinations of these groups like cycloalkylenealkylene, biscycloalkylene, biscycloalkylenealkylene, arylenealkylene, bisphenylene, bisphenylenealkylene, amido alkylene groups, amongst which for example the group $CONH(CH_2)_3$, or —$OCH_2CH(OH)CH_2$— and —NHC(O)— groups. Preferred L groups are alkyl groups (preferably linear), having preferably 10 carbon atoms or less, more preferably 5 carbon atoms or less, for example ethylene and propylene groups.

Preferred $R^2$ groups comprise a polyoxyethylene group —$(CH_2CH_2O)_n$—, a polyoxypropylene group, or combinations of these groups.

The preferred organosilanes of formula I are compounds of following formula II:

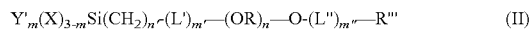

$$Y'_m(X)_{3-m}Si(CH_2)_{n'}(L')_{m'}-(OR)_n-O-(L'')_{m''}-R''' \quad (II)$$

where R''' is a hydrogen atom, a linear or branched acyl or alkyl group, optionally substituted by one or more functional groups, and which may furthermore comprise one or more double bonds, R is a linear or branched alkyl group, preferably linear, for example an ethylene or a propylene group, L' and L'' are divalent groups, X, Y' and m are such as defined hereabove, n' is an integer ranging from 1 to 10, preferably from 1 to 5, n is an integer ranging from 2 to 50, preferably from 5 to 30, more preferably from 5 to 15, m' is 0 or 1, preferably 0, m" is 0 or 1, preferably 0.

The groups L' and L", when present, may be selected from divalent groups L previously described and represent preferably the group —OCH$_2$CH(OH)CH$_2$— or the group —NHC(O)—. In this case, the groups —OCH$_2$CH(OH) CH$_2$— or —NHC(O)— are linked to the adjacent groups (CH$_2$)$_{n'}$ (with a group L') and R'" (with a group L") through their oxygen atom (for the group —OCH$_2$CH(OH)CH$_2$—) or through their nitrogen atom (for the group —NHC(O)—).

In one embodiment, m=0 and the hydrolyzable groups X represent methoxy or ethoxy groups. n' is preferably 3. In another embodiment, R'" represents an alkyl group possessing less than 5 carbon atoms, preferably a methyl group. R'" may also represent an aliphatic or aromatic acyl group, especially an acetyl group.

Lastly, R'" may represent a trialkoxysilylalkylene group or a trihalogenosilylalkylene group such as a group —(CH$_2$)$_n$—Si(R$^5$)$_3$ where R$^5$ is a hydrolyzable group such as the previously defined X groups and n" is an integer such as the previously defined n' integer. An example of such a R'" group is the group —(CH$_2$)$_3$Si(OC$_2$H$_5$)$_3$. In this embodiment, the organosilane compound comprises two silicon atoms carrying at least one hydrolyzable group.

In preferred embodiments, n is 3, or does range from 6 to 9, from 9 to 12, from 21 to 24, or from 25 to 30, preferably from 6 to 9.

To be mentioned as suitable compounds of formula II are for example 2-[methoxy(polyethyleneoxy)propyl] trimethoxysilane compounds of formulas CH$_3$O— (CH$_2$CH$_2$O)$_{6-9}$—(CH$_2$)$_3$Si(OCH$_3$)$_3$ (III) and CH$_3$O— (CH$_2$CH$_2$O)$_{9-12}$—(CH$_2$)$_3$Si(OCH$_3$)$_3$ (IV), marketed by Gelest, Inc. or ABCR, the compound of formula CH$_3$O— (CH$_2$CH$_2$O)$_3$—(CH$_2$)$_3$Si(OCH$_3$)$_3$ (VIII), compounds of formula CH$_3$O—(CH$_2$CH$_2$O)$_n$—(CH$_2$)$_3$Si(OC$_2$H$_5$)$_3$ where n=21-24, 2-[methoxy(polyethyleneoxy)propyl]trichlorosilane, 2-[acetoxy(polyethyleneoxy)propyl]trimethoxysilane, 2-[acetoxy(polyethyleneoxy)propyl]triethoxysilane 2-[hydroxy(polyethyleneoxy)propyl]trimethoxysilane, 2-[hydroxy(polyethyleneoxy)propyl]triethoxysilane, compounds of formulas HO—(CH$_2$CH$_2$O)$_{8-12}$—(CH$_2$)$_3$Si(OCH$_3$)$_3$ and HO—(CH$_2$CH$_2$O)$_{8-12}$—(CH$_2$)$_3$Si(OC$_2$H$_5$)$_3$, polypropylenebis[(3-methyldimethoxysilyl)propyl]oxide, and compounds with two siloxane heads such as those of formulae (V), (VI) and (VII) disclosed in WO 2011/080472.

Preferred compounds of formula II are [alkoxy(polyalkylenoxy)alkyl]trialkoxysilanes or their trihalogenated analogues (m=m'=m"=0, R'"=alkoxy).

Preferably, the compound bearing a polyoxyalkylene group of the invention has no fluorine atom. Typically, the fluorine weight ratio towards the antifog coating precursor coating is of less than 5%, preferably of less than 1% by weight and more preferably of 0%.

Preferably, the molecular weight of the compound bearing a polyoxyalkylene group according to the invention ranges from 400 to 4000 g/mol, preferably from 400 to 1500 g/mol, more preferably from 400 to 1200 g/mol, and even more preferably from 400 to 1000 g/mol.

Of course it is possible to graft a mixture of compounds of formula I or II, for example a mixture of compounds with different polyoxyalkylene RO chain lengths.

In one embodiment of the invention, the antifog coating precursor comprises more than 80% by weight of a compound bearing a polyoxyalkylene group according to the invention, relative to the antifog coating precursor total weight, preferably more than 90%, more preferably more than 95% and most preferably more than 98%. In one embodiment, the antifog coating precursor consists in a layer of said compound bearing a polyoxyalkylene group, preferably an organosilane compound.

Preferably, the antifog coating precursor coating of the invention comprises less than 5% by weight of a metal oxide or metalloid (for example silica or alumina) relative to the coating total weight, more preferably it is free of any. When the organosilane compound used for making the antifog coating is deposited under vacuum, preferably no metal oxide is co-evaporated, according to the coevaporation method of at least one organic compound and at least one inorganic compound described in the application EP 1324078.

Preferably, the antifog coating precursor coating does not comprise any crosslinking agent, which means that is preferably not formed from a composition comprising a crosslinking agent, for example tetraethoxysilane.

The antifog coating precursor coating of the invention has preferably a static contact angle with water of more than 10° and of less than 50°, preferably lower than or equal to 45°, more preferably ≤40°, even more preferably ≤30° and most preferably ≤25°. This contact angle does preferably range from 15° to 40°, more preferably from 20° to 30°.

The deposition of the at least one compound bearing a polyoxyalkylene group onto the surface of the antireflection coating may be carried out according to usual procedures, preferably by gas phase deposition or liquid phase deposition, most preferably in the gas phase, by vacuum evaporation.

When the grafting is carried out in gas phase, for example by evaporation under vacuum, it may be followed, if needed, with a step for removing the excess of the deposited compound bearing a polyoxyalkylene group so as to retain only the compound bearing a polyoxyalkylene group that is really grafted onto the surface of the antireflection coating. Non grafted molecules are thus removed. Such a removal step should be preferably performed when the thickness of the antifog coating precursor initially deposited is higher than 5 nm.

However, this step of removing the compound bearing a polyoxyalkylene group in excess can be omitted in some cases, seeing that it is possible to deposit the organosilane compound so as to form a grafted layer, that is to say once it is ensured that the deposited thickness does not exceed a few nanometers. Adjusting the deposition parameters for obtaining such thicknesses belongs to the ordinary competence of any person skilled in the art.

Nevertheless, it is preferred to form the antifog coating precursor coating by depositing some compound bearing a polyoxyalkylene group in excess onto the surface of the antireflection coating and thereafter removing the excess of this deposited but not grafted compound. Indeed, the inventors observed that when a layer of grafted compound bearing a polyoxyalkylene group is directly formed with a thickness lower than or equal to 5 nm, which does not require any removal of compound bearing a polyoxyalkylene group in excess, it is sometimes possible to obtain a precursor coating of an antifog coating, the surface of which has not a sufficient affinity towards a liquid solution comprising at least one surfactant, which would lead to a coating not having the desired antifogging properties.

Surprisingly, this is not observed when the compound bearing a polyoxyalkylene group is deposited in excess, as previously indicated, and such excess is removed later on. The actual physical thickness of the layer of compound bearing a polyoxyalkylene group deposited in excess is preferably lower than or equal to 20 nm.

Removing the compound bearing a polyoxyalkylene group deposited in excess may be performed by rinsing (wet process) using for example a soapy water-based solution and/or by wiping (dry process). Preferably, the removal step comprises a rinsing operation followed with a wiping operation.

Preferably, the rinsing operation is performed by cleaning the article with some soapy water (comprising a surfactant) using a sponge. Thereafter a rinsing operation is performed with deionized water, and optionally, the lens is thereafter submitted to a wiping operation for typically less than 20 seconds, preferably 5 to 20 seconds, by means of a CEMOI™ or Selvith™ cloth impregnated with alcohol, typically isopropyl alcohol. Another rinsing operation with deionized water may then be repeated, then a wiping operation with a wiping cloth. All these steps may be carried out manually or be partially or fully automated.

The step for removing the compound bearing a polyoxyalkylene group in excess leads to a layer of this compound having generally and preferably a thickness of 5 nm or less. In this case, the compound deposited onto the surface of the optical article forms a monomolecular or a quasi-monomolecular layer.

The compound bearing a polyoxyalkylene group may be beforehand dissolved in a solvent prior to being evaporated, for better controlling the evaporation rate and the deposition rate. The thickness of the film may be controlled in this way thanks to this dissolution and by adjusting the amount of solution to be evaporated.

When the grafting is carried out using a wet process, for example by dipping or spin-coating, it is generally not necessary to perform a step for removing the compound bearing a polyoxyalkylene group deposited in excess.

The antifog coating precursor coating according to the invention has a low roughness. Typically, for an organosilane compound deposited by vapor phase, the roughness mean value Ra is lower than 2 nm, typically of about 1 nm. Ra is such as defined in WO 2011/080472.

A temporary antifog coating according to the invention is obtained by depositing onto the antifog coating precursor coating a surfactant film containing at least one surfactant A having a sorbitan ring with n of its four hydroxyl groups functionalized with the same or different OH-terminated polyoxyalkylene groups, preferably OH-terminated polyoxyethylene groups, and p of its four hydroxyl groups functionalized with the same or different $R^1$ groups of formula:

in which $R_d$ is a linear or branched alkylene group, z is an integer ≥1, Y is a divalent group, n2 is 0 or 1 (preferably n2=1) and R' is a saturated hydrocarbon group having from 12 to 19, preferably from 13 to 19 carbon atoms, n and p being integers such that n=2 or 3 and p=1 or 2, with n+p=4. Preferably, n=3 and/or p=1.

$R_d$ preferably represents a C2-C6 alkylene group such as propylene or ethylene, more preferably ethylene.

Integer z preferably ranges from 1 to 40, more preferably from 2 to 20, even more preferably from 2 to 10.

The OH-terminated polyoxyalkylene groups of compound A preferably comprise from 1 to 40 oxyalkylene groups, more preferably from 2 to 20, even more preferably from 2 to 10.

The total number of oxyalkylene groups present in the structure of surfactant A preferably ranges from 4 to 40, more preferably from 8 to 30, even more preferably from 15 to 25, and is ideally equal to 20.

R' is a saturated hydrocarbon group having preferably from 14 to 18 carbon atoms, more preferably 15 to 17 carbon atoms. R' is preferably a linear alkyl group. R' is preferably n-$C_{15}H_{31}$ or n-$C_{17}H_{35}$.

Non limiting examples of Y groups include linear or branched, optionally substituted alkylene, cycloalkylene, arylene, carbonyl, amido groups, or combinations of these groups. Y is preferably a carbonyl group.

The group —$(Y)_{n2}$—R' is preferably a palmityl group or a stearyl group.

The chemical structure of sorbitan is recalled hereunder:

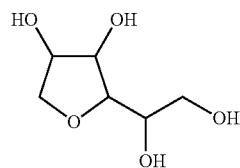 [SMILES: OCC(O)C1OCC(O)C1O]

Surfactant A is preferably non-ionic and is preferably a polyoxyalkylene sorbitan fatty acid ester, i.e., a polyoxyalkylenylated sorbitan esterified once or twice with a fatty acid (Y=carbonyl and n2=1), preferably once. More preferably, surfactant A is a polyoxyethylene sorbitan fatty acid ester (Y=carbonyl, n2=1 and R=$CH_2CH_2$), in other words a polysorbate with a specific chain length for the ester group.

A preferred class of surfactants A comprises compounds of formula (IX):

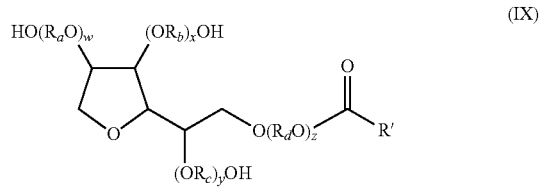

in which $R_a$, $R_b$, $R_c$ and $R_d$ independently represent linear or branched alkylene groups, preferably linear, preferably C2-C6 alkylene groups such as propylene or ethylene, more preferably ethylene, w, x, y and z independently represent integers 1, preferably ranging from 1 to 40, more preferably from 2 to 20, even more preferably from 2 to 10, and R' is such as defined previously. Preferably, w+x+y+z ranges from 4 to 40, more preferably from 8 to 30, even more preferably from 15 to 25. Ideally, w+x+y+z=20.

Still more preferably, surfactants A have are polyethoxylated compounds of formula (X):

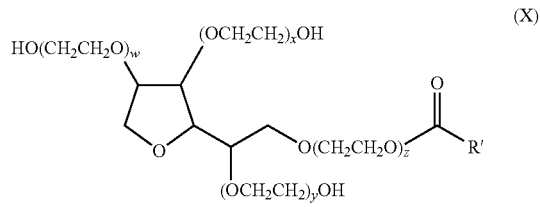

wherein w, x, y, z and R' are such as defined previously.

Surfactants A can be easily synthesized from relatively cheap raw materials, or are commercially available. In particular, surfactants A of formula IX are commercially available with relatively low price under the trade names Alkest™, Canarcel™ or Tween™.

Preferred surfactants A are commercialized under the trade name Tween™ 40, also known as polyoxyethylene (20) sorbitan monopalmitate (compound of formula X in which $R'=C_{15}H_{31}$ and $w+x+y+z=20$) and Tween™ 60 also known as polyoxyethylene (20) sorbitan monostearate (compound of formula X in which $R'=C_{17}H_{35}$ and $w+x+y+z=20$). On the contrary, Tween™ 20 (which does not bear a C12-C19 R' alkyl group) and Tween™ 80 (which does not bear a saturated R' hydrocarbon group) are not surfactants A according to the invention.

At least one surfactant A is applied on the surface of the antifog coating precursor coating in a manner such that a surfactant film is formed. Said film is preferably formed from a composition containing at least one surfactant A, preferably a surfactant liquid solution. Film formation does not involve formation of covalent bonds between surfactant A and the underlying layer, i.e., with the compounds bearing a polyoxyalkylene group present in the antifog coating precursor.

In the remainder of the specification, embodiments concerning a surfactant liquid solution will be described in more detail.

Preferably, the surfactant composition does not comprise surfactants other than surfactants A.

The surfactant solution provides the optical article, preferably a spectacle lens, with an antifog temporary protection by creating on its surface a uniform layer that contributes to disperse the water droplets on the surface of the optical article so that no visible fog is formed.

The surfactant solution is preferably applied by depositing at least one drop of this solution onto the surface of the antifog coating precursor and then by spreading it so as to cover preferably the whole precursor coating.

The surfactant solution applied is generally an aqueous solution, comprising preferably from 0.5 to 15%, more preferably from 2 to 8% by weight of surfactants A, relative to the weight of the liquid solution. The solution may also comprise alcohols, such as ethanol or isopropyl alcohol, in an amount generally of less than 10% by weight.

The surfactant composition based on compounds A being surprisingly significantly more efficient to provide long-lasting antifogging properties, it may be employed in reduced amounts as compared to surfactants of the prior art, typically in amounts ranging from 2 to 6% by weight, more preferably from 2 to 4% by weight, relative to the weight of the composition.

The surfactant solution reduces the static contact angle with water of the surface of the optical article, especially of a spectacle lens.

The antifog coating of the invention preferably has a static contact angle with water lower than or equal to 10°, more preferably lower than or equal to 5°.

An immediately operational antifog coating is obtained as soon as the surfactant composition is applied on the antifog coating precursor. Thus, it is not necessary to apply many times a surfactant solution to obtain the antifogging effect, as is the case with products of the prior art.

In addition, the antifogging effect provided by the antifog coating is long-lasting over time. This durability is tested during fogging and defogging cycles, in a procedure described in the experimental section.

The antifog coating is temporary but easily renewable, since it just has to be performed a new application of surfactant when there are not sufficient surfactant molecules adsorbed onto the surface of the antifog coating precursor anymore. The latter therefore remains "activable" in all circumstances.

One of the major advantages of the invention is that surfactants A modify the residual color of an antireflection coating when applied at the surface of a lens comprising such a coating and, deposited thereon, an antifog coating precursor comprising polyoxyalkylene group-containing compounds.

In the case of an achromatic antireflection coating coated with the same antifog coating precursor, i.e., an antireflection coating that does not exhibit a residual color, applying a surfactant A film causes appearance of a residual color in the antireflection coating.

In the context of the present invention, antireflection coatings having a residual color are preferred.

Color change or color appearance are easily detectable by the naked eye.

This unique behavior is not observed with other surfactants or lenses devoid of antifog coating precursor comprising polyoxyalkylene group-containing compounds. Therefore, so long as the residual color of the antireflection seen by the user is uniform and different from the residual color of the antireflection coating observed in the absence of surfactant A containing film, there is no need to renew the surfactant film at the surface of the lens. However, when the modified color is fading and/or becomes non uniform, the user is informed that the optical article will soon no longer be protected from fog.

The following examples illustrate the invention in a more detailed yet non limiting way. Unless otherwise mentioned, all percentages are expressed by weight.

EXAMPLES

1. Materials and Optical Articles Used

Silica is used in the form of granules provided by the Optron Inc. company. The organosilane compound used in the examples to form the antifog coating precursor is 2-[methoxy(polyethyleneoxy)propyl]trimethoxysilane comprising from 6 to 9 ethylene oxide units, of formula (III) and with a molecular weight 450-600 g/mol (CAS No.: 65994-07-2. Ref: SIM6492.7, provided by the Gelest, Inc. company). Tween™ compounds have been purchased from CRODA.

The lens used comprises a lens substrate in an ORMA® material, comprising a polyurethane-based impact-resistant primer with a thickness of about 1 micron, itself provided with an abrasion-resistant coating with a thickness of about 3 microns by depositing and curing a composition such as defined in example 3 of the patent EP 0614957, coated in turn with a five-layer antireflective coating $ZrO_2/SiO_2/ZrO_2/ITO/SiO_2$ (noted antireflective coating Y) deposited onto the abrasion-resistant coating by evaporation under vacuum of the materials in the order in which they are mentioned (respective thicknesses of the layers: 29, 23, 68, 7 and 85 nm). An ITO layer is an electrically conductive layer of indium oxide doped with tin ($In_2O_3$:Sn).

These lenses are treated on both faces according to the methods described hereafter, the concave face being treated before the convex face.

In the examples, the antireflection coating is not submitted to any activating treatment prior to depositing the antifog coating precursor.

2. Vapor Deposition of the Antifog Coating Precursor Coating

In the examples, the deposition is carried out on the antireflective coating Y of a lens by evaporation under vacuum using a Joule effect-based heating source.

The siloxane compound of formula III is poured in a copper capsule (in the absence of any porous material), and this capsule is deposited onto a heating support in conductive tantalum. The evaporating device is a SATIS 1200 DLF or BALZERS BAK apparatus. The evaporation pressure of the siloxane compound of formula III does generally vary from $5 \cdot 10^{-6}$ to $8 \cdot 10^{-6}$ mbar for SATIS 1200 DLF. Once the evaporation is completed, the surface of each lens is rinsed with some soapy water, optionally with isopropyl alcohol, then deionized water and wiped with a Cémoi™ dry cloth so that the excess of siloxane compound of formula III deposited be removed.

The Cémoi™ cloth is a cloth provided by the Facol supplier under the reference Microfibre M8405 30×40.

3. Application of a Surfactant-containing Liquid Solution (Temporary Antifog Solution)

3.1 Preparation of Surfactant Solutions

Two different surfactants were used:

Tween™ 40, also known as Polyoxyethylene (20) sorbitan monopalmitate, is the surfactant used for preparing the surfactant solutions of the invention.

Zonyl® FSO 100 (from DuPont) is used as a comparative surfactant. Zonyl® FSO 100 is a mixture of compounds of formula $F(CF_2)_y—(CH_2—CH_2O)_{x+1}H$ wherein y is equal to 6, 8 and 10 with weight amounts respectively of about 65%, 30% and 5%, and x is an integer ranging from 2 to 13.

Solutions were prepared for each surfactant as follows: the surfactant was dissolved in a mixture of deionized water and isopropyl alcohol (IPA), so as to obtain an aqueous solution containing:

2.5% by weight of IPA and 6% by weight of Zonyl® FSO-100, or

20% by weight of IPA and 3 or 6% by weight of Tween™ 40.

3.2. Deposition of the Surfactant Solution onto Lenses

The lenses provided with an antifog coating precursor coating prepared under 2 were treated by means of the solutions described under 3.1.

Each solution was applied as follows:
1. Stir the solution vial before use.
2. Hold the lens between the thumb and the forefinger and apply 2 drops of the surfactant solution on the center of the convex face of the lens.
3. Using a clean Cémoi™ cloth (supplier Facol Microfibre M8405 30×40), spread the drops with the fingertip over all of the lens surface without rubbing (max 7 seconds).
4. Perform the same operation with the concave face of the lens.
5. Allow drying for 5 to 10 seconds and control the lens, as for transmission only, under the ambient light (ceiling light consisting in a neon tube), by keeping the lens at a distance from the eye of from 30 to 50 cm.
6. Using another clean Cémoi™ cloth, wipe the edge of the lens.
7. Remove the white marks (if any) which are visible in transmission, the Cémoi™ cloth being held with the forefinger tip, without strongly rubbing. The lens should be clean and devoid of any white mark over its entire surface.

The method makes it possible to obtain a perfectly transparent ophthalmic lens.

4. Hot Vapor Test and Evaluation of the Residual Color of the Antireflection Coating Before the test, the lenses with an antifog coating precursor coating under 2 were placed for 24 hours in a temperature-regulated environment (20-25° C.) and under 40 to 50% humidity.

Thereafter, the lenses were treated according to 3.2 with a surfactant solution as described in 3.1, the surfactant comprising 6% by weight of Tween™ 40.

For the test, the surfactant treated lenses were placed for 15 seconds above a heated container containing water at 52° C. Immediately after, a visual acuity scale located at a distance of 5 m is observed through the tested lens. This test makes it possible to simulate the ordinary living conditions where a wearer leans his face towards a cup of tea/coffee or towards a pan filled with boiling water.

The observer evaluates the visual acuity and the color score according to the following criteria:

The antifog scores (A, B, C or D) correspond to the fog level at the end of each hot vapor test:

A: Homogeneous water film (acuity 10/10)

B: Visual distortion considered as acceptable by the wearer

C: Visual distortion considered as not acceptable by the wearer (heterogeneous water film)

D: Totally diffusing white haze, fine water drops.

The lenses are considered as having successfully passed the hot vapor test if they obtained the score A or B.

Deposition of a film of Tween™ 40 on the surface of lenses prepared according to §1 and 2 makes the residual color of the antireflection coating change from green to blue. The extent of the bluish residual color of the antireflection coating is evaluated in reflection at ambient light or under a Waldmann lamp by giving the following scores:

3: more than 80% of the surface of the lens appears bluish.

2: 50-80% of the surface of the lens appears bluish.

1: from 10 to less than 50% of the surface of the lens appears bluish.

0: less than 10% of the surface of the lens appears bluish.

At the end of this first hot vapor test, the lenses were dried such as described in §5 of the experimental part of WO 2011/080472 (without wiping cycles) and then subjected to additional hot vapor test/drying cycles, after having controlled under a Waldmann lamp that they were totally dry.

Antifog and color scores were given to the lenses after performing 1, 9 and 12 hot vapor tests. The results are given in the following table (Table 1):

TABLE 1

| Example | Lens | Surfactant | | Number of hot vapor tests | | | |
|---|---|---|---|---|---|---|---|
| | | | | 0 | 1 | 9 | 12 |
| 1 | G1 | Tween ™ 40 (6%) | Hot vapor test score | — | A | B | C |
| | G1 | | Color score | 3 | 3 | 2 | 1 |
| C1 | G1 | Zonyl ® FSO-100 6% | Color score | 0 | 0 | 0 | 0 |

TABLE 1-continued

| Example | Lens | Surfactant | | Number of hot vapor tests | | | |
|---|---|---|---|---|---|---|---|
| | | | | 0 | 1 | 9 | 12 |
| C2 | G2 | Tween™ 40 (6%) | Hot vapor test score | — | D | | |
| | | | Color score | 0 | 0 | | |
| C3 | G3 | Tween™ 40 (6%) | Hot vapor test score | — | C | | |
| | | | Color score | 0 | 0 | | |
| C4 | G4 | Tween™ 40 (6%) | Hot vapor test score | — | C | | |
| | | | Color score | 0 | 0 | | |

Lens G1 is a lens prepared according to §1 and 2 hereabove. Lens G2 differs from lens G1 in that it comprises a 2 nm thick fluorinated anti-fouling topcoat (Optool DSX™) rather than an antifog coating precursor coating. Lens G3 is an antifog spectacle lens commercialized by Seiko (Super Sovereign Fogless™), which comprises a substrate having a refractive index of 1.6 and a precursor coating of an antifog coating. Lens G4 is an antifog spectacle lens commercialized by Tokai (Tokai Foggy Guard™), which comprises a substrate having a refractive index of 1.6 and a precursor coating of an antifog coating.

It is worth mentioning that the hot vapor test score and the color score before applying the surfactant solution on the surface of lens G1 are respectively C and 0.

It can be seen in table 1 that decrease of the antifog properties of the lenses coated with a temporary antifog coating according to the invention (comprising a film of the surfactant Tween™ 40) under repetitive exposure to fogging conditions can be correlated with the decrease of the extent of the antireflection coating residual bluish color. Similar antifog results were obtained with the Tween™ 60 surfactant, but no such effect was observed with Zonyl® FSO-100 (comparative surfactant of comparative example C1). Therefore, surfactants according to the invention provide the user with an interesting means for visually controlling the time when it will be necessary to "reload" the lens surface with additional surfactant.

Further, the speed of evaporation of the water film formed at the surface of the lens after fogging was the same for Tween™ 40 and Zonyl® FSO-100 surfactants.

It can also be observed that no residual color change occurred on the antireflection coating of lenses G2, G3 and G4. Lenses G2 are devoid of antifog coating precursor, while lenses G3 and G4 comprise an antifog coating precursor, but which fails to comprise polyoxyalkylene group-containing compounds. Further, those comparative lenses do not exhibit satisfactory antifog properties when coated with a sorbitan surfactant A according to the invention after only one fogging/defogging cycle.

Thus, the benefit of antireflection coating residual color change is only observed on lenses combining an antifog coating precursor comprising polyoxyalkylene group-containing compounds and a surfactant film containing at least one surfactant A according to the invention.

5. Tests Under Winter and Tropical Conditions

These tests were performed using the system for determining the antifog performance of transparent optical articles that is fully described in French patent application n° 11.53814 filed on May 4, 2011, and represented on FIG. 1 of said patent application, where it is labeled (20).

A lens passes the test when obtaining a sharpness coefficient N≥0.6. A lens failed in this test when obtaining a sharpness coefficient N<0.6. The sharpness coefficient N is defined in French patent application n° 11.53814.

a) Winter Conditions

In this test, the lenses provided with an antifog coating precursor coating prepared under 2 and further treated as described in 3.2 by means of the solutions described under 3.1 were stored for 60 minutes under "winter conditions" (4° C., 40% humidity) and were then rapidly subjected to normal conditions (20° C., 50% humidity). The results are shown below:

TABLE 2

| Surfactant | No wiping | 10 wipings | 30 wipings |
|---|---|---|---|
| Zonyl ® FSO-100 6% (2 lenses) (comparative) | 2 pass | 2 pass | 1 pass, 1 fail |
| Tween™ 40 6% (5 lenses) | 4 pass, 1 fail | 4 pass, 1 fail | 3 pass, 2 fail | b) Tropical Conditions

In this test, the lenses provided with an antifog coating precursor coating prepared under 2 and further treated by means of the solutions described under 3.1 were stored for 30 minutes under normal conditions (20° C., 45% humidity) and were then rapidly subjected to "tropical conditions" (30° C., 70% humidity). The results are shown below:

TABLE 3

| Surfactant | No wiping | 10 wipings | 30 wipings | 50 wipings |
|---|---|---|---|---|
| Zonyl ® FSO-100 6% (2 lenses) | 1 pass, 1 fail | 2 fail | 2 fail | 2 fail |
| Tween™ 40 3% (5 lenses) | 5 pass | 5 pass | 5 pass | 5 pass |

It can be concluded from these two series of tests that Zonyl® FSO-100 and Tween™ 40 have satisfactory antifogging performances under winter conditions. Tween™ 40 (3% by weight) is more efficient than Zonyl® FSO-100 (3% by weight) under tropical conditions.

6. Durability of the Antifogging Effect after a Mechanical Stress (After Application of a Surfactant Solution)

This test enables to evaluate the resistance to wiping of the temporary anti-fog solution onto the surface of the lenses. It was carried out on 10 lenses. The general test protocol is described in §5 of the experimental part of WO 2011/080472.

Each lens was initially subjected to a series of 5 wipings, then 10, 10, 10, 20, 20 and 20 additional wiping operations were performed. Briefly, a hot vapor test followed by a drying step is carried out between each series of wipings.

Here, a wiping operation corresponds to one moderately marked rotation of a wiping cloth Cémoi™ on both faces of the lens (the lens is pressed between the thumb and the forefinger).

The antifog scores (A, B, C or D) are detailed in §4. The lenses are considered as having successfully passed the durability test if they obtained the score A or B.

The results in the table hereunder reveal that the durability of antifog performance of Tween™ 40 (3% by weight) after a mechanical stress is satisfactory:

TABLE 4

| Lens n° | Surfactant containing solution | Antifog score after X (cumulated) wiping operations with X = | | | | | | |
|---|---|---|---|---|---|---|---|---|
| | | 0 | 5 | 15 | 25 | 35 | 55 | 75 | 95 |
| 1, 3, 5, 6, 8 | Tween ™ 40 3% (1, 3, 5); 6%(6, 8) | A | A | A | A | A | A | A | A |
| 2 | Tween ™ 40 3% | A | A | B | A | A | B | B | B |
| 4 | Tween ™ 40 3% | B | B | B | B | B | B | B | B |
| 7 | Tween ™ 40 6% | B | A | A | B | A | A | A | A |
| 9 | Tween ™ 40 6% | B | B | B | B | B | A | B | B |
| 10 | Tween ™ 40 6% | A | A | A | A | B | A | A |

7. Cosmetic Aspect of the Lenses and Glide Ability

In these tests, the lenses provided with an antifog coating precursor coating prepared under 2 were further treated by means of the solutions described under 3.1 (6% by weight of Tween™ 40) or another aqueous solution according to the invention (6% by weight of Tween™ 60+20% by weight of IPA) or comparative aqueous solutions (6% by weight of Tween™ 20 or Tween™ 80+20% by weight of IPA).

The following cosmetic scores (A, B, C or D) were given as a function of the % of the lens surface devoid of white marks after spreading of the surfactant solution:
A: 100% of the lens surface is devoid of white marks.
B: 60-less than 100% of the lens surface is devoid of white marks.
C: 20-less than 60% of the lens surface is devoid of white marks.
D: 0-less than 20% of the lens surface is devoid of white marks.

The glide ability of a cloth at the surface of the lenses upon spreading the surfactant solutions was also assessed. The following glide scores were given:
3: very good glide ability.
2: good glide ability.
1: low glide ability, the cloth cling to the surface.
0: very bad glide ability, the cloth cling a lot to the surface (this score is obtained with pure water).

The results obtained are shown in table 5:

TABLE 5

| Lens n° | Surfactant containing solution | Cosmetic score | Glide score |
|---|---|---|---|
| 1 | Tween ™ 40 (6%) | B | 2 |
| 2 | Tween ™ 60 (6%) | B | 2 |
| C1 | Zonyl ® FSO-100 (6%) | A | 3 |
| C2 | Tween ™ 20 (6%) | C | 1 |
| C3 | Tween ™ 80 (6%) | D | 1 |

The cosmetic scores obtained with surfactants A according to the invention (lenses 1 and 2) are inferior to the score obtained with Zonyl® FSO-100 surfactant (comparative lens C1) due to the presence of a few white marks at the surface of the lens after application and spreading of the surfactants. However, these marks are easy to remove as described in §3.2 in the case of lenses 1 and 2. On the cosmetic point of view, Tween™ 40 is slightly better than Tween™ 60. The glide ability imparted by Tween™ 40 and Tween™ 60 is satisfactory.

Tween™ 20 and Tween™ 80 (comparative lenses C2 and C3), which are not surfactants A according to the invention, have insufficient glide ability and insufficient cosmetic score.

The invention claimed is:

1. An optical article comprising a substrate having at least one main surface coated with an antireflection coating and, directly contacting said antireflection coating, a precursor coating of an antifog coating obtained through the grafting on said antireflection coating of at least one compound B bearing a polyoxyalkylene group, said coating precursor of the antifog coating being coated with a surfactant film so as to form an antifog coating, characterized in that said surfactant film contains at least one surfactant A having a sorbitan ring with n of its four hydroxyl groups functionalized with the same or different OH-terminated polyoxyalkylene groups, and p of its four hydroxyl groups functionalized with the same or different $R^1$ groups of formula:

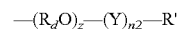

in which $R_d$ is an alkylene group, z is an integer≥1, Y is a divalent group, n2 is 0 or 1 and R' is a saturated hydrocarbon group having from 12 to 19 carbon atoms, n and p being integers such that n=2 or 3 and p=1 or 2 with n+p=4.

2. The optical article of claim 1, wherein compound B bearing a polyoxyalkylene group is an organosilane having at least one silicon atom bearing at least one hydrolyzable group.

3. The optical article of claim 1, wherein the antireflection coating has an outer surface bearing silanol groups.

4. The optical article according to claim 1, wherein the surfactant film is formed by applying onto the coating precursor of the antifog coating a liquid solution containing at least one surfactant A.

5. The optical article of claim 4, wherein the liquid solution comprises from 0.5 to 15%, by weight of surfactants A, relative to the weight of said solution.

6. The optical article according to claim 1, wherein n2=1 and Y is a carbonyl group.

7. The optical article according to claim 1, wherein surfactant A is a polyoxyethylene sorbitan fatty acid ester.

8. The optical article according to claim 1, wherein surfactant A is a compound of formula (IX):

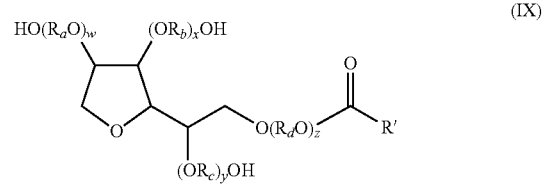

in which $R_a$, $R_b$, $R_c$ and $R_d$ independently represent linear or branched alkylene groups, w, x, y and z independently represent integers ≥1, and R' is as previously defined.

9. The optical article according to claim 1, wherein R' is a saturated hydrocarbon group comprising from 14 to 18 carbon atoms.

10. The optical article according to claim 1, wherein the total number of oxyalkylene groups present in the structure of surfactant A ranges from 4 to 40.

11. The optical article according to claim 1, wherein the coating precursor of the antifog coating has a thickness lower than or equal to 5 nm.

12. The optical article according to claim 1, wherein compound B is a compound of formula:

$R^{11}Y'_{m}Si(X)_{3-m}$ (I)

in which the Y' groups, being the same or different, are monovalent organic groups bound to the silicon through a carbon atom, the X groups, being the same or different, are hydrolyzable groups, $R^{11}$ is a group comprising a polyoxyalkylene group, and m is an integer equal to 0, 1 or 2.

13. The optical article according to claim 1, further defined as an ophthalmic lens.

14. An optical article comprising a substrate having at least one main surface coated with an antireflection coating, and directly contacting said antireflection coating a precursor coating of an antifog coating, wherein said antireflection coating displays a residual color when no surfactant film is applied onto said coating precursor of the antifog coating and a modified residual color when a film of a surfactant capable of modifying the residual color displayed by said antireflection coating is applied onto said coating precursor of the antifog coating, characterized in that said coating precursor of the antifog coating is coated with a film of surfactant capable of modifying the residual color displayed by said antireflection coating so as to form an antifog coating.

15. A method for determining whether a spectacle lens exhibits antifog properties and, if needed, imparting antifog properties to said spectacle lens, comprising:

providing a spectacle lens comprising a substrate having at least one main surface coated with an antireflection coating, and directly contacting said antireflection coating a precursor coating of an antifog coating, wherein said antireflection coating displays a residual color when no surfactant film is applied onto said coating precursor of the antifog coating and a modified residual color when a film of a surfactant capable of modifying the residual color displayed by said antireflection coating is applied onto said coating precursor of the antifog coating, determining visually which residual color is displayed by said antireflection coating, and if at least part of the antireflection coating does not display the modified residual color, applying an additional amount of surfactant capable of modifying the residual color displayed by said antireflection coating on said at least part of the coating precursor of the antifog coating so as to restore the antifog properties of the spectacle lens.

16. The optical article of claim 2, wherein the antireflection coating has an outer surface bearing silanol groups.

17. The optical article of claim 1, wherein R' is a saturated hydrocarbon group having from 13 to 19 carbon atoms.

18. The optical article of claim 4 wherein the liquid solution comprises from 2 to 8% by weight of surfactants A, relative to the weight of said solution.

19. The optical article according to claim 1, wherein R' is a saturated hydrocarbon group comprising from 15 to 17 carbon atoms.

20. The optical article according to claim 1, wherein the total number of oxyalkylene groups present in the structure of surfactant A ranges from 8 to 30.

\* \* \* \* \*